UNITED STATES PATENT OFFICE.

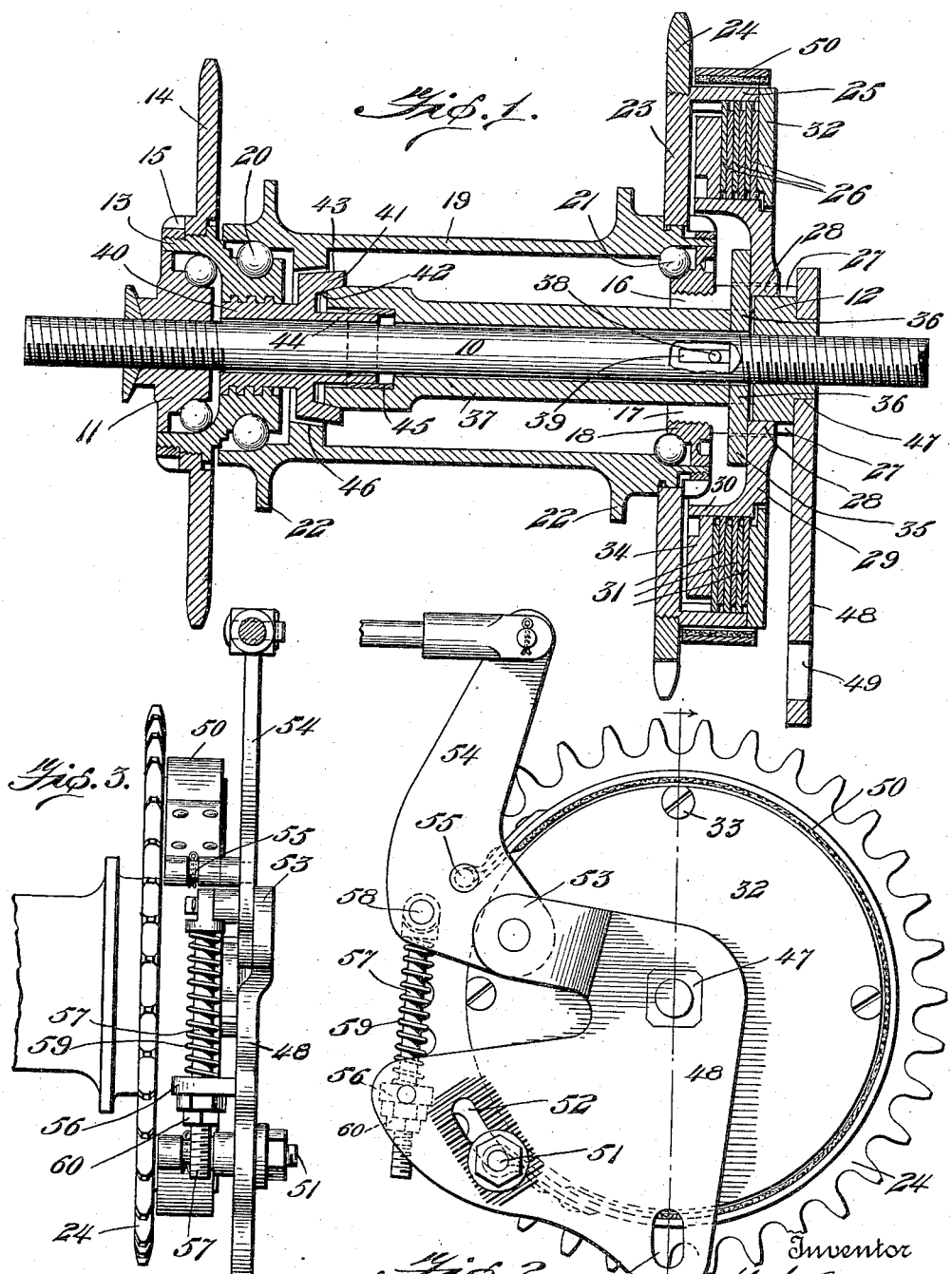

FREDERICK S. ELLETT, OF ELMIRA, NEW YORK.

BRAKE MECHANISM.

1,168,614.  Specification of Letters Patent.  Patented Jan. 18, 1916.

Application filed August 19, 1913.  Serial No. 785,571.

*To all whom it may concern:*

Be it known that I, FREDERICK S. ELLETT, a citizen of the United States, and resident of Elmira, county of Chemung, State of New York, have invented certain new and useful Improvements in Brake Mechanism, of which the following is a specification.

This invention relates to motorcycles and more particularly improvements in the driving wheel hub whereby the latter is provided with two independent brakes, one of which is normally used as the service brake and the other of which is used as an emergency brake.

The service brake may be of any suitable type, but I prefer to use a friction disk brake in combination with a coaster attachment whereby the usual sprocket which is driven by the pedals is adapted to actuate the service brake as well as form a driving means for the hub.

The novel features of the invention will be apparent from the following description taken in connection with the accompanying drawings which illustrate what I now consider to be the preferred form of my invention.

In the drawings: Figure 1 is a longitudinal section through a wheel hub embodying my invention: Fig. 2 is an elevation of the right hand side of Fig. 1; and Fig. 3 is an elevation of the left hand side of Fig. 2.

Referring to the drawings: 10 indicates the usual axle member which is provided with the threaded end portions on which are arranged the bearing members or cones 11 and 12. The bearing member 11 has rotatably mounted thereon a sleeve 13 which carries a driving wheel or sprocket 14, the latter being secured in position by means of a nut 15. The bearing member 12 is provided with axial slots 16 and 17 in its inner end portion and has a detachable ball race 18 secured thereon.

A wheel hub 19 is rotatably mounted on the ball bearings 20 and 21, the bearing 20 being on the sleeve 13 and the bearing 21 on the race 18. The hub 19 is provided with the usual spoke flanges 22 and has secured to one end thereof a cylindrical shell 23 which carries a driving sprocket 24. As will be observed from Fig. 1, the shell 23 has an axially extending flange 25 forming a cylindrical chamber in which a plurality of friction disks 26 are carried.

The bearing member 12 is provided with axially extending slots 27 in its outer surface which receive tongues or projections 28 on a disk 29, this disk being held against rotation by the bearing member 12, but being free to move axially thereon. The disk 29 has an axially extending flange 30 which carries a plurality of disks 31 alternately arranged with respect to the disks 26 and coöperating therewith to form a brake for the hub 19.

The outer side of the chamber formed by the flange 25 is closed by means of a plate 32 which is secured to the flange in any suitable manner, as by means of the screws 33 and against which the friction disks are pressed when moved into gripping engagement. The flange 30 of the disk 29 carries an annular plate or ring 34 and the disks 26 and 31 are arranged between this plate and the plate 32. By this construction it will be seen from Fig. 1 that when the disk 29 is moved toward the right the disks 26 and 31 will be pressed together and, since the disks 31 are non-rotatable, it is obvious that the hub 19 will be retarded.

For the purpose of moving the disk 29 to effect the gripping and ungripping of the disks 26 and 31, I have provided a ring 35 having inwardly extending tongues or projections 36 arranged in the slots 16 and 17 and engaged by the end of a tubular member 37 which surrounds the axle 10. The end of the member 37 is arranged in a suitable bore in the bearing member 12 and is free to move axially but is prevented from turning by means of a pin 38 carried by the axle member and projecting into suitable slots 39 in the member 37.

The sleeve 13 is internally threaded and in engagement with the threaded end of an axially movable member 40, the inner end of which is provided with a flange 41 having inner and outer conical surfaces 42 and 43, respectively. The conical surface 42 is arranged to engage the conical end of the member 37, and move this member to effect the gripping of the friction disks and a tubular extension 44 on the member 40 is arranged in a suitable recess in the end of the member 37 and has connected therewith a retarding spring 45 which engages the member 37 and is adapted to normally hold the member 40 against rotation. The conical surface 43 is adapted to engage a corresponding surface 46 on the interior of the hub member to form a driving connection between the member 40 and the hub, the engagement of this surface with the surface 46 limiting the axial movement of the member 40 and permitting the hub to be driven by means of the wheel 14.

When the friction disks 26 and 31 are in engagement there is a strong turning force acting on the bearing member 12 and in order to hold this bearing member against rotation I have provided the squared end 47 on which is arranged a plate or bracket 48 provided with a slot 49 by means of which the plate is adapted to be secured to the frame of the motorcycle. The bracket 48 also acts as a support for a brake mechanism which comprises a brake band 50 adapted to engage the outer surface of the flange 25 and having one end attached to a bolt 51 which is adjustably secured in a slot 52 in the plate 48. The outer surface of the plate 48, adjacent the slot 52, is roughened or corrugated, as shown in Fig. 2, for the purpose of securely holding the bolt 51 in any desired position. The plate 48 also has an offset arm 53 on which is pivotally mounted an operating lever 54. The other end of the brake band 50 is secured to a pin 55 carried by the lever 54 so that when the lever is moved toward the left in Fig. 2 the band 50 will be contracted on the outer surface of the flange 25.

Pivotally mounted on the plate 48 is an abutment 56 through which passes a bolt 57. The bolt 57 has its head arranged on a pivot 58 carried by the lever 54 and the spring 59 surrounds the bolt and is arranged between the head thereof and the abutment 56 and is adapted to move the lever 54 to expand the band 50 so as to disengage the latter from the flange 25. The bolt 57 is provided with the nuts 60 by means of which the expansion of the brake band is limited, the nuts engaging the abutment 56, as clearly shown in Figs. 2 and 3.

In the operation of the mechanism, the wheel hub may be rotated, by means of the sprocket 14, by rotating this sprocket in the direction to draw the member 40 so as to effect an engagement of the conical surfaces 43 and 46. If the sprocket 14 is rotated in the opposite direction, the member 40 will be moved toward the right in Fig. 1 and engage the member 37 so as to move the latter and effect a gripping engagement of the clutch disks 26 and 31 and thereby retard the rotation of the hub 19. The brake band 50 may also be employed to retard the hub 19 by actuating the lever 54, so as to contract the band against the exterior surface of the flange 25. The actuation of the brake band 50 is entirely independent of the disk brake, but the parts are so constructed that the flange 25 coöperates with both brakes.

It will be seen from the drawings that I have provided a very simple and compact arrangement and that all of the parts are readily accessible and removable for purposes of repair.

Having thus described my invention what I claim is:

1. The combination of a non-rotatable axle member, a wheel hub rotatable relatively thereto, a driving wheel secured to the hub and provided with an axially extending flange, a friction member carried by said flange on the interior thereof, a non-rotatable friction member adapted to be pressed against the first-mentioned member to retard the hub, a bracket secured to said non-rotatable friction member and adapted to hold the same against rotation, and a band brake anchored to said bracket and arranged to engage the exterior of said flange.

2. In a motorcycle, the combination of a non-rotatable axle member, a driving member rotatable thereon, a rotatably mounted hub, a second driving member rigidly connected with the hub, said driving members being at opposite ends of the hub, a friction member carried by said second driving member, a non-rotatable friction member coöperating with the first-mentioned friction member, means actuated by the first driving member to form a driving connection between the same and said hub, means whereby said driving member effects the gripping and ungripping of said friction members, and a band brake operating on said second driving member.

3. In a motorcycle, the combination of an axle member, a hub rotatable thereon and having an axial extension at one end, a friction member carried by said extension, a non-rotatable friction member coöperating with the first mentioned friction member to form a brake for the hub, a bracket secured to the motorcycle frame and connected with said non-rotatable friction member to hold the same against rotation, a brake band anchored to said bracket and adapted to engage the exterior of said extension to act as a brake for the hub, and an actuating lever for said band pivoted to said bracket.

4. In a motorcycle, the combination of an axle member, a hub rotatable thereon and having an axial extension at one end, a friction member carried by said extension, a non-rotatable friction member coöperating with said first mentioned friction member to form a brake for the hub, a bracket secured to the motorcycle frame and connected with said non-rotatable friction member to hold the same against rotation, a brake-band adjustably anchored to said bracket and adapted to engage the exterior of said extension to act as a brake for the hub, an actuating lever for said brake band pivotally connected with said bracket, and spring means coöperating with said actuating lever and said bracket to disengage said band from said extension.

5. In a motorcycle, the combination of an axle member, a hub rotatable thereon and having an axial extension at one end, friction members carried by said extension, non-rotatable friction members coöperating with the first-mentioned friction members to form a brake for the hub, a bracket secured to the motorcycle frame and connected with said non-rotatable friction members to hold the same against rotation, and a brake band anchored to said bracket and adapted to engage the exterior of said extension to act as a brake for the hub.

6. In a motorcycle, the combination of an axle member, bearing members on said axle member, a hub rotatably supported by said bearing members, said hub having an axial extension at one end forming an annular chamber, a non-rotatable axially movable member carried by one of said bearing members in said chamber, coöperating friction members carried by said extension and said axially movable member and adapted to form a brake for the hub, a brake support rigidly secured on the outer end of said last-mentioned bearing member and adapted to be secured to the motorcycle frame, a brake band coöperating with the exterior of said extension and having one end secured to said brake support, and an operating lever pivotally mounted on said support and connected with the other end of the brake band.

7. In a motorcycle, the combination of an axle member, bearing members on said axle member, a hub rotatably supported by said bearing members, said hub having an axial extension at one end forming an annular chamber, a non-rotatable axially movable member carried by one of said bearing members in said chamber, coöperating friction members carried by said extension and said axially movable member and adapted to form a brake for the hub, a brake support rigidly secured on the outer end of said last-mentioned bearing member and adapted to be secured to the motorcycle frame, a brake band coöperating with the exterior of said extension and having one end adjustably secured to said brake support, an operating lever pivotally mounted on said support, and spring means coöperating with said lever and said support to automatically release the brake band from said extension.

In testimony whereof I affix my signature in presence of two witnesses.

FREDERICK S. ELLETT.

Witnesses:
J. C. FERGUSON,
J. L. HOLLERAN.